United States Patent Office 3,442,941
Patented May 6, 1969

---

3,442,941
SULFUR CONTAINING CARBOXYLIC ACIDS
Carl D. Emerson, Kansas City, Mo., and Paul C. Aichenegg, Prairie Village, Kans., assignors to Chemagro Corporation, New York, N.Y., a corporation of New York
No Drawing. Filed Oct. 2, 1964, Ser. No. 401,253
Int. Cl. C07c *149/20, 149/40;* A01n *9/12*
U.S. Cl. 260—539                                  9 Claims

---

ABSTRACT OF THE DISCLOSURE

Compounds are prepared having the formula:

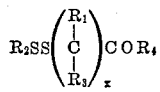

where $R_1$ and $R_3$ are selected from the group consisting of hydrogen, lower alkyl, carboxyl lower alkyl, alkyl, carbocyclic aryl, carbocyclic haloaryl, haloalkyl, and ester of carboxy lower alkyl;
$R_2$ is selected from the group consisting of polyhaloethyl and polyhalovinyl;
$R_4$ is selected from the group consisting of OH, SH, $OR_5$ where $R_5$ is selected from the group consisting of alkyl, carbocyclic aryl, halocarbocyclic aryl, haloalkyl and alkylthioalkyl, $SR_5$,

where:

$R_6$ and $R_7$ are selected from the group consisting of hydrogen, alkyl and carbocyclic alkyl and $R_6$ and $R_7$ together with N complete a heterocyclic ring, and OMe where Me is selected from the group consisting of the metals of Groups I, II, VI, VII and VIII of the Periodic Table; and $x$ is an integer from 1 to 2 inclusive. Such materials have been found useful to kill nematodes, fungi and undesirable plants. They also are useful as defoliating agents.

---

The present invention relates to novel disulfide acids and their derivatives and uses thereof.

It is an object of the present invention to prepare novel disulfide acids and their derivatives.

Another object is to prepare novel pesticidal compositions.

A more specific object is to kill nematodes.

A further object is to kill fungi.

An additional object is to prepare novel herbicides.

Yet another object is to defoliate cotton, beans and other plants.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having the formula

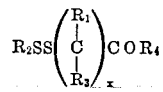

where $R_1$ and $R_3$ are hydrogen, lower alkyl, carboxy lower alkyl, alkyl or aryl or haloaryl or haloalkyl ester of carboxy lower alkyl; $R_2$ is polyhaloethyl or polyhalovinyl; $R_4$ is OH, SH, $OR_5$ where $R_5$ is alkyl, aryl, haloaryl, haloalkyl, or alkylthioalkyl,

where $R_6$ and $R_7$ are hydrogen, alkyl or aryl, or together with N complete a heterocyclic ring, or $SR_5$ where $R_5$ is as previously defined, or OM, where M is a metal of Groups I, II, VI, VII or VIII of the periodic table, e.g., sodium, potassium, calcium, barium, chromium, tungsten zinc, silver, mercury, iron, manganese, magnesium, cobalt, nickel, copper or lithium, and $x$ is 1 or 2.

The compounds of the present invention have wide biological activity and are useful as bactericides, nematocides, fungicides, defoliants and herbicides, especially postemergent herbicides.

They can be prepared by reacting equimolar amounts of a compound having the formula $R_2SCl$ with a compound having the formula

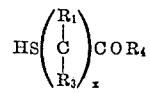

and removing the HCl byproduct.

It is well known that compounds having a perchloromethyl group function differently than compounds having a polychloroethyl group. The 2,2,2-trichloroethyl group and the 1,2,2-trichloroethyl group can be converted to the 2,2-dichlorovinyl group and the 1,2-dihclorovinyl group by dehydrohalogenation. There is no possibility of forming thiophosgene with the compounds of the present invention whereas there is such a likelihood with compounds containing the perchloromethylthio group.

Many of the compounds of the present invention have an asymmetrical carbon atom. Such compounds exist in both the dextro and levo forms as well as a racemic mixture. While all these forms are useful it has been observed that in some cases there is a difference in activity between the dextro and levo rotatory forms.

The general procedures employed for preparing the products of the invention were as follows:

1. *Free disulfide acids and their salts*

The free mercapto acid, e.g. thioglycolic acid, thiolactic acid, thiomalic acid and β-mercaptopropionic acid was dissolved or suspended in dry chloroform or carbon tetrachloride. The appropriate sulfenyl chloride, e.g., 1,2,2-trichloroethyl sulfenyl chloride, 2,2,2-trichloroethyl sulfenyl chloride, 1,2-dichlorovinyl sulfenyl chloride or 2,2-dichlorovinyl sulfenyl chloride, was then added dropwise at a rate to maintain the temperature at 25–35° C. The reaction was complete when a drop of the solution gave a negative reaction to KI-starch test paper. The end product was isolated by washing the mixture 2–4 times with equal volumes of water, drying of the organic solution over anhydrous magnesium sulfate, filtering and vacuum stripping.

The products were obtained in 80% to quantitative yields. Purification can be accomplished by recrystallization or chromatography if desired. The salts of the acids were made by conventional methods, e.g. salts of the desired metals with weak acids are evaporated in calculated quantities together with the free acid of the present invention in a suitable solvent, e.g. there can be used equimolar amounts of sodium bicarbonate and S-(1,2,2-trichloroethylthio) glycolic acid in chloroform.

2. Oxygen and sulfur esters

The disulfide acid prepared by process 1 was mixed with an excess of thionyl chloride and warmed to 50–60° C. until no more $SO_2$ and/or HCl was expelled. The mixture was then stripped in high vacuum to remove the excess thionyl chloride. The residue was dissolved in 2 volumes of dry chloroform or carbon tetrachloride and the desired alcohol or mercaptan dissolved in the same diluent, was added dropwise at 40° C. to reflux. In the case of S-methyl esters, gaseous methyl mercaptan was introduced. In the preparation of some of the oxygen esters triethylamine was added with alcohol to remove the formed HCl. After removal of residual HCl, alcohol or mercaptan, the esters were isolated in yields of 90% to quantitative.

3. Amides of the free acids

The acid chloride of the chosen disulfide acid was diluted with dry chloroform, carbon tetrachloride or diethyl ether. Two equivalents of the appropriate amine were dissolved in the same diluent and added dropwise at 15–20° C. The mixture was filtered to remove amine hydrochloride, the organic solution washed with water, dried over anhydrous magnesium sulfate and vacuum stripped to give the amine in yields of 90% to quantitative.

Unless otherwise indicated all parts and percentages are by weight.

The preferred polyhaloethyl compounds are trichloroethyl compounds.

Illustrative of compounds within the present invention are

S-(1,2,2-trichloroethylthio)-O-methyl thioglycolate,
S-(1,2,2-trichloroethylthio)-O-ethylthioglycolate,
S-(2,2,2-trichloroethylthio)-O-ethylthioglycolate,
S-(1,2,2-trichloroethylthio)-thioglycolic acid,
S-(2,2,2-trichloroethylthio)-thioglycolic acid,
S-(1,2-dichlorovinylthio)-thioglycolic acid,
S-(2,2-dichlorovinylthio)-thioglycolic acid,
S-(2,2,2-trichloroethylthio)-S-methyl thioglycolate,
S-(1,2,2-trichloroethylthio)-thiolactic acid,
S-(2,2,2-trichloroethylthio)-thiolactic acid,
S-(1,2-dichlorovinylthio)-thiolactic acid,
S-(2,2-dichlorovinylthio)-thiolactic acid,
S-(1,2,2-trichloroethylthio)-O-(2,4-dichlorophenyl)-thiolactate,
S-(1,2,2-trichloroethylthio)-S'-(2,4-dichlorophenyl)-dithiolactate,
S-(1,2,2-trichloroethylthio)-thiolactamide,
S-(1,2,2-trichloroethylthio)-N,N-diethylthiolactamide,
S-(1,2,2-trichloroethylthio)-thiolactanilide,
S-(1,2,2-trichloroethylthio)-thiomalic acid,
S-(2,2,2-trichloroethylthio)-thiomalic acid,
S-(2,2-dichlorovinylthio)-thiomalic acid,
S-(1,2,2-trichloroethylthio)-β-mercapto-propionic acid,
N-(S-1,2,2-trichloroethylthio)-thioglycolyl-morpholine,
N-(S-1,2,2-trichloroethylthio)-thioglycolyl-phthalimide,
S-(1,2,2-trichloroethylthio)-O-(2,2,2-trichloroethyl)-thiolactate,
S-(1,2,2-trichloroethylthio)-O-(2-chloroethyl)-thiolactate,
S-(1,2,2-trichloroethylthio)-S'-(propylthioethyl)-dithiolactate,
S-(1,2,2-trichloroethylthio)-O-butyl-thioglycolate,
S-(2,2,2-trichloroethylthio)-O-octyl-thioglycolate,
S-(1,2,2-trichloroethylthio)-O-phenyl-thioglycolate,
S-(1,2-dichlorovinyl)-O-phenyl-thioglycolate,
S-(2,2-dichlorovinyl)-O-hexylthioglycolate,
S-(1,2-dichloroethylthio)-O-propyl-thioglycolate,
S-(2,2-dichloroethylthio)-O-ethyl-thioglycolate,
S-(1,2,2-trichloroethylthio)-dithioglycolic acid,
S-(2,2,2-trichloroethylthio)-S'-methyl dithioglycolate,
S-(1,2,2-trichloroethylthio)-O-(4-chlorophenyl)-thioglycolate,
S-(2,2-dichlorovinylthio)-O-(2-bromophenyl)-thioglycolate,
S-(2,2,2-trichloroethylthio-N-methylthioglycolamide,
S-(1,2,2-trichloroethylthio)-O-sodium thioglycolate,
S-(2,2,2-trichloroethylthio)-O-potassium thioglycolate,
S-(1,2-dichlorovinylthio)-O-calcium thioglycolate,
S-(2,2-dichlorovinylthio)-O-zinc thioglycolate,
S-(1,2,2-trichloroethylthio)-O-silver thioglycolate,
S-(2,2,2-trichloroethylthio)-O-copper thioglycolate,
S-(1,2-dichlorovinylthio)-O-barium thioglycolate,
S-(2,2-dichlorovinylthio)-O-ferric thioglycolate,
S-(1,2,2-trichloroethylthio)-O-maganese thioglycolate,
S-(2,2,2-trichloroethylthio)-O-magnesium thioglycolate,
S-(1,2-dichlorovinylthio)-O-cobalt thiolactate,
S-(2,2-dichlorovinylthio)-O-sodium thiolactate,
S-(1,2,2-trichloroethylthio)-O-potassium thiomalate,
S-(2,2,2-trichloroethylthio)-O-calcium thio β-mercaptopropionate,
S-(1,2-dichlorovinylthio)-O-ethyl-β-mercaptopropionate,
S-(1,2-dichlorovinylthio)-thiomalic acid,
S-(2,2-dichlorovinylthio)-β-mercaptopropionic acid,
S-(2,2-dichlorovinylthio)-O-methyl-β-mercaptopropionate,
S-(2,2-dichlorovinylthio)-O,O-dibutyl thiomalate,
S-(1,2-dichlorovinylthio)-O-isopropyl-thiolactate,
S-(2,2-dichlorovinylthio)-O,O-diphenyl-thiomalate,
S-(1,2,2-trichloroethylthio)-O-p-tolyl-thioglycolate,
S-(2,2,2-trichloroethylthio)-O-β-naphthyl-thioglycolate.

EXAMPLE 1

To 18.4 grams of thioglycolic acid (0.2 mole) in chloroform there were added dropwise 40.0 grams (0.2 mole) of 1,2,2-trichloroethyl sulfenyl chloride at 30–35° C. The product was washed with water, dried and vacuum stripped to give S-(1,2,2-trichloroethylthio)thioglycolic acid in a 96% yield as a faintly yellow oil $n_D^{20}$ 1.5846, percent Cl 41.4% (theory 41.7%), percent S 24.5% (theory 25.1%).

EXAMPLE 2

The procedure of Example 1 was repeated using 10.2 grams (0.111 mole) of thioglycolic acid in chloroform at 25–30° C. and adding 20.0 grams (0.1 mole) of 2,2,2-trichloroethyl sulfenyl chloride. There was obtained after washing, drying and vacuum stripping S-(2,2,2-trichloroethylthio)-thioglycolic acid in a quantitative yield as a colorless oil $n_D^{20}$ 1.5759, percent Cl 40.3%, percent S 25.8%.

EXAMPLE 3

The procedure of Example 1 was repeated using 9.2 grams (0.1 mole) of thioglycolic acid in chloroform at 25–30° C. and adding 16.5 grams (0.1 mole) of 1,2-dichlorovinyl sulfenyl chloride to produce S-(1,2-dichlorovinylthio)-thioglycolic acid in a 92% yield as a faintly yellow oil $n_D^{20}$ 1.5873.

EXAMPLE 4

The procedure of Example 1 was repeated using 18.4 grams of thioglycolic acid and 32.6 grams of 2,2-dichlorovinyl sulfenyl chloride to produce S-(2,2-dichlorovinylthio)-thioglycolic acid in a 89% yield as a yellow oil $n_D^{20}$ 1.6023.

EXAMPLE 5

19 grams of the product of Example 1 (0.0742 mole) was mixed with 11.9 grams of thionyl chloride (0.1 mole) in chloroform at 35–40° C., vacuum stripped, diluted with 2 volumes of chloroform, and then 3.2 grams (0.1 mole) of methanol added dropwise at 40° C. to give after vacuum stripping S-(1,2,2 - trichloroethylthio)-O-methyl-thioglycolate in a 88% yield as a faintly yellow oil, $n_D^{20}$ 1.5584, percent 23.6% (theory 23.8%).

EXAMPLE 6

12.0 grams (0.1 mole) of mercaptoethylacetate in chloroform was treated at 30–35° C. with 20.0 grams of 1,2,2-trichloroethyl sulfenyl chloride (0.1 mole), the product isolated by washing with water, drying and vacuum stripping to produce S-(1,2,2-trichloroethylthio)-O-ethyl-thioglycolate in a 95% yield as a faintly yellow oil, $n_D^{20}$ 1.5444.

EXAMPLE 7

The procedure of Example 6 was repeated replacing the 1,2,2-trichloroethyl sulfenyl chloride with 20.0 grams of 2,2,2-trichloroethyl sulfenyl chloride to product S-(2,2,2-trichloroethylthio)-O-ethyl-thioglycolate in a 97% yield as a light yellow oil, $n_D^{20}$ 1.5363, percent Cl 36.8% (theory 37.5%).

EXAMPLE 8

15 grams (0.0589 mole) of the product of Example 2 was treated in the manner set forth in Example 5 with 7.0 grams (0.06 mole) of thionyl chloride in chloroform at 40° C., vacuum stripped, diluted with chloroform and reacted with gaseous methyl mercaptan, to produce S-(2,2,2-trichloroethylthio)-S-methyl-thioglycolate in a 89% yield as a yellow oil, $n_D^{20}$ 1.5858.

EXAMPLE 9

To 10.6 grams of thiolactic acid (0.1 mole) in chloroform there were added dropwise 20.0 grams (0.1 mole) of 1,2,2-trichloroethyl sulfenyl chloride at 30–35° C. The product was washed with water, dried and vacuum stripped to give S-(1,2-trichloroethylthio)thiolactic acid in a 97% yield as a faintly yellow oil, $n_D^{20}$ 1.5647, percent Cl 39.7% (theory 39.6%).

EXAMPLE 10

The procedure of Example 9 was repeated using 21.2 grams of thiolactic acid and 40.0 grams of 2,2,2-trichloroethyl sulfenyl chloride (0.2 mole) as the reactants to produce S-(2,2,2-trichloroethylthio)-thiolactic acid in a 98% yield as a white crystalline solid, M.P. 83°, percent Cl 38.9% (theory 39.6%), percent S 24.6% (theory 23.8%).

EXAMPLE 11

The procedure of Example 9 was repeated using 21.2 grams of thiolactic acid and 32.6 grams (0.2 mole) of 1,2-dichlorovinyl sulfenyl chloride as the reactants to produce S-(1,2-dichlorovinylthio)-thiolactic acid in a 92% yield as a yellow oil, $n_D^{20}$ 1.5767.

EXAMPLE 12

The procedure of Example 9 was repeated using 10.6 grams of thiolactic acid and 16.4 grams of 2,2-dichlorovinyl sulfenyl chloride as the reactants to produce S-(2,2-dichlorovinylthio)-thiolactic acid in a 86% yield as a white crystalline solid, M.P. 50–52° C., Cl 30.6% (theory 30.3%,) S 27.5% (theory 27.4%).

EXAMPLE 13

13.5 grams (0.05 mole) of the product of Example 9 was mixed with 6.0 grams (0.05 mole) of thionyl chloride in carbon tetrachlorides at reflux, the mixture vacuum stripped, the residue dissolved in carbon tetrachloride and treated with 8.15 grams (0.05 mole) of 2,4-dichlorophenol at reflux to obtain after vacuum stripping S-(1,2,2-trichloroethylthio)-O-(2,4 - dichlorophenyl)-thiolactate in a 88% yield as a brownish oil, $n_D^{20}$ 1.5705, S 15.0% (theory 15.4%).

EXAMPLE 14

The procedure of Example 13 was repeated except that the dichlorophenol was replaced by 8.95 grams (0.05 mole) of 2,4-dichlorothiophenol and the reaction temperature was 30–35° C. in the final step. There was produced S-(1,2,2-trichloroethylthio) - S - (2,4-dichlorophenyl)-thiolactate in a 94.5% yield as a yellow oil, $n_D^{20}$ 1.6085 which crystallized on standing to a solid M.P. 72–74° C., percent S 22.2% (theory 22.3%).

EXAMPLE 15

27 grams (0.1 mole) of the product of Example 9 was treated with 11.9 grams of thionyl chloride (0.1 mole) at 75° C., the mixture vacuum stripped and to the residue dissolved in chloroform, there were added dropwise 3.4 grams of ammonia also dissolved in chloroform. The amine hydrochloride was filtered off and the product purified as set forth supra in Method 3 to give S-(1,2,2-trichloroethylthio)-thiolactamide in a 95% yield as a light yellow oil, $n_D^{28}$ 1.5641.

EXAMPLE 16

The procedure of Example 15 was repeated using 13.5 grams of the product of Example 9 with 6.0 grams of thionyl chloride and the chloroform solution of ammonia was replaced by a chloroform solution containing 7.3 grams (0.1 mole) of diethyl amine to produce S-(1,2,2-trichloroethylthio)-N,N-diethyl-thiolactamide in a 98% yield as a dark oil.

EXAMPLE 17

The procedure of Example 15 was repeated using 27 grams of the product of Example 9 with 16 grams of thionyl chloride and replacing the chloroform solution of ammonium with an ether solution of 18.6 grams (0.2 mole) of aniline to produce S-(1,2,2-trichloroethylthio)-thiolactanilide in a 93% yield as a brownish oil.

EXAMPLE 18

15.0 grams of thiomalic acid (0.1 mole) in chloroform was treated with the dropwise addition of 20 grams of 1,2,2-trichloroethyl sulfenyl chloride (0.1 mole) at 25–30° C. and the product worked up as in Example 1 to give S-(1,2,2-trichloroethylthio)-thiomalic acid in an 80% yield as a white, crystalline solid, M.P. 139–140° C., percent Cl 33.3% (theory 34.0%), S 20.1% (theory 20.4%).

EXAMPLE 19

The procedure of Example 18 was repeated but the reactants employed were 6.75 grams of thiomalic acid (0.045 mole) and 9.0 grams (0.045 mole) of 2,2,2-trichloroethyl sulfenyl chloride to produce S-(2,2,2-trichloroethylthio) thiomalic acid in a yield of 92% as a white, crystalline solid, M.P. 109–110° C., percent S 20.5% (theory 20.4%).

EXAMPLE 20

Treatment of 30.0 grams of thiomalic acid (0.2 mole) with 32.8 grams (0.2 mole) of 2,2-dichlorovinyl sulfenyl chloride using the procedure of Example 18 produced S-(2,2-dichlorovinylthio)-thiomalic acid in a yield of 88% as a white, crystalline solid, M.P. 151-152° C., S 24.1% (theory 23.1%), Cl 24.2% (theory 25.6%).

EXAMPLE 21

The procedure of Example 1 was repeated but employing as the reactants 10.6 grams or β-mercapto proionic acid (0.1 mole) and 20.0 grams (0.1 mole) of 1,2,2-trichloroethyl sulfenyl chloride to produce S - (1,2,2-trichloroethylthio)-β-mercapto-propionate acid in a 90% yield as a colorless oil, $n_D^{25}$ 1.5681, Cl 40.9% (theory 39.8%).

EXAMPLE 22

12.8 grams (0.05 mole) of the product of Example 1 was treated with 6.0 grams (0.05 mole) of thionyl chloride at 70° C., the mixture vacuum stripped and to the residue dissolved in chloroform there was added dropwise 8.7 grams (0.1 mole) of morpholine in chloroform at 10–15° C. The product was purified as described in Example 15 and there was obtained N-(S-(1,2,2-trichloroethylthio)-thioglycolyl) morpholine in a quantitative yield as a brown oil, $n_D^{20}$ 1.5711.

EXAMPLE 23

The procedure of Example 22 was repeated but the reaction of the 12.8 grams of the product of Example 1 with 6.0 grams of thionyl chloride was carried out at 75° C. and the morpholine was replaced by 9.25 grams of potassium phthalimide which was added at 30–35° C. to produce N-S-(1,2,2-trichloroethylthio)-thioglycolyl-phthalimide as a buff colored solid.

EXAMPLE 24

20.5 grams of thionyl chloride (a 7% excess over 0.15 mole) were added to 40.5 grams (0.15 mole) of the product of Example 9 and the mixture heated at 75° C. until no more $SO_2$ and HCl came off (about 2 hours).

The mixture was then stripped under high vacuum (0.02–0.03 mm.) and the residue made up to 150 ml. with chloroform. This was then divided into three equal portions.

To the first 50 ml. of the chloroform solution of S-(1,2,2-trichloroethylthio)-thiolactoyl chloride thus prepared there was added 7.5 grams 0.05 mole) of 2,2,2-trichloroethanol and the mixture warmed at 65–70° C. until no more HCl was evolved and then evacuated at 200 mm. Hg. There was obtained as the product S-(1,2,2-trichloroethylthio)-O-2,2,2-trichloroethyl thiolactate in a 70% yield as an oil $n_D^{20}$ 1.5390.

EXAMPLE 25

To the second 50 ml. chloroform solution of the lactoyl chloride prepared in Example 24 there was added 4.03 grams (0.05 mole) of ethylene chlorohydrin dissolved in 15 ml. of chloroform. The mixture was then warmed at 65–70° C. until no more HCl was evolved (2 hours) and then evacuated with a vacuum of 200 mm. Hg. The product was washed three times with water, dried, filtered and vacuum stripped to produce S-(1,2,2-trichloroethylthio)-O-2-chloroethyl-thiolactate in a 93.5% yield as an oil $n_D^{20}$ 1.5489, Cl 42.4% (theory 42.8%), S 19.29% (theory 19.3%).

EXAMPLE 26

To the third 50 ml. chloroform solution of the lactoyl chloride prepared in Example 24 there was added 6.8 grams (0.05 mole) of propylthioethyl mercaptan dissolved in 15 ml. of chloroform. The mixture was then warmed at 65–70° C. until no more HCl was evolved (2 hours) and then evacuated at 200 mm. The product was washed once with dilute aqueous sodium bicarbonate and then three times with water, dried, filtered, and vacuum stripped to obtain S-(1,2,2-trichloroethylthio)-S'-propylthioethyl dithiolactate of the formula

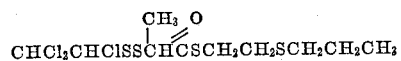

in a 91% yield as an oil $n_D^{20}$ 1.57111, Cl 27.0% (theory 27.3%).

The compounds of the present invention can be used alone as nematocides, fungicides, herbicides and defoliants but it has been found desirable to apply them to the pest or plant together with inert solids to form dusts, or more preferably suspended in a suitable liquid diluent, preferably water. There can also be added surface active agents and inert solids in such liquid formulations. Desirably, 0.05–1% by weight of surface active agent is employed. The active ingredient can be from 0.01 to 95% by weight of the entire composition in such cases.

In place of water there can be employed organic solvents as carriers, e.g. hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., ethanol, isopropanol and amyl alcohol, etc.

The novel materials can also be applied as aerosols, e.g. by dispersing them in air by means of a compressed gas such as dichlorodifluoromethane or trichlorofluoromethane and other Freons for example.

The materials of the present invention can also be applied with inert adjuvants or carriers such as talc, pyrophyllite, synthetic fine silica, Attaclay, kieselguhr, chalk, diatomaceous earth, lime, calcium carbonate, bentonite, fuller's earth, cottonseed hulls, wheat flour, soyabean flour, pumice, tripoli, wood flour, walnut shell flour, redwood flour and lignin.

It is frequently desirable to incorporate a surface active agent in the pesticidal compositions of this invention. Such surface active agents, i.e. wetting agent, are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkyl benzene sulfonates having 14 to 18 carbon atoms in the alkyl group, alkylphenolethylene oxide condensation products, e.g. p-isooctylphenol condensed with 10 ethylene oxide units, soaps, e.g. sodium stearate and potassium oleate, sodium salt of propylnaphthalene sulfonic acid, (di-2-ethyl hexyl) ester of sodium sulfosuccinic acid, sodium lauryl sulfate, sodium salt of the sulfonated monoglyceride of cocoanut fatty acids, sorbitan sesquioleate, lauryl trimethylammonium chloride, octadecyl trimethyl ammonium chloride, polyethylene glycol lauryl ether, polyethylene esters of fatty acids and rosin acids, e.g. Ethofat 7 and 13, sodium N-methyl-N-oleyl-taurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide propylene oxide condensation products, e.g. Pluronic 61, sorbitan monolaurate, polyethylene glycol ester of tall oil acids, sodium octylphenoxyethoxyethyl sulfate, tris (polyoxyethylene) sorbitan monostearate (Tween 60), sodium dihexyl sulfosuccinate.

The solid and liquid formulations can be prepared by any of the conventional methods. Thus the active ingredient can be mixed with the solid carrier in finely divided form in amounts small enough to preserve the freeflowing property of the final dust composition.

In the following examples or tables the disulfides were formulated as wettable powders consisting of 50% of the disulfide, 46% Hi-Sil 233 (ultra fine silica), 2% Marasperse N (sodium lignin sulfonate) and 2% Pluronic L–61 (polyethylene oxide-propylene oxide molecular weight about 1000). This wettable powder is hereinafter designated as Formulation A.

These 50% by weight disulfide containing wettable powders were diluted with water to such an extent as to obtain final concentrations of the disulfides of 200, 100, 50, 25, 12.5 p.p.m. during the actual tests.

The saprophytic nematode tests were carried out in water as the medium with Panagrellus and Rhabditis spp. at room temperature. The results were recorded as percent kill after a 4 days incubation period. The blank mortality was 0–10% kill.

The saprophytic nematode test results are set forth in Table 1.

TABLE 1

| Compound of Example: | Percent Kill of Saprophytic Nematodes at Rate (p.p.m.) | | | | |
|---|---|---|---|---|---|
| | 200 | 100 | 50 | 25 | 12.5 |
| 1 | 100 | 80 | 40 | 30 | 0 |
| 2 | 0 | 0 | 0 | 0 | 0 |
| 3 | 100 | 70 | 30 | 0 | 0 |
| 4 | 50 | 30 | 0 | 0 | 0 |
| 5 | 100 | 100 | 100 | 40 | 0 |
| 6 | 100 | 100 | 100 | 100 | 80 |
| 7 | 100 | 100 | 50 | 30 | 0 |
| 8 | 80 | 50 | 30 | 0 | 0 |
| 9 | 100 | 80 | 80 | 40 | 0 |
| 10 | 50 | 0 | 0 | 0 | 0 |
| 11 | 80 | 50 | 30 | 0 | 0 |
| 12 | 30 | 0 | 0 | 0 | 0 |
| 13 | 100 | 100 | 100 | 80 | 50 |
| 14 | 100 | 60 | 30 | 0 | 0 |
| 15 | 100 | 100 | 100 | 100 | 80 |
| 17 | 50 | 50 | 30 | 0 | 0 |
| 18 | 100 | 100 | 50 | 30 | 0 |
| 19 | 100 | 100 | 80 | 40 | 0 |
| 20 | 80 | 50 | 30 | 0 | 0 |
| 21 | 100 | 80 | 40 | 0 | 0 |
| 22 | 80 | 50 | 30 | 0 | 0 |
| 23 | 30 | 0 | 0 | 0 | 0 |
| 24 | 50 | 30 | 10 | 10 | 10 |
| 25 | 50 | 30 | 10 | 10 | 10 |
| 26 | 50 | 30 | 10 | 10 | 10 |

The most active nematocides were the compounds of Examples 6, 13 and 15. In commercial practice the compositions containing the nematocides of the present invention are applied to the soil infested with nematodes.

The compounds were also tested as fungicides in plate fungicide tests as indicated in Table 2. The compounds were made up into Formulation A and then added to agar cultures of the fungi. In the table 10 indicates 100% effectiveness and 0 indicates no effectiveness as a fungicide. In Table 2 P stands for *Pythium irregulare*, R for *Rhizoctonia solani*, H for *Helminthosporium sativum* and F for *Fusarium oxysporum*. The concentrations are expressed as p.p.m.

The most effective fungicides in this test were those of Examples 11 and 16. The next most effective fungicides were those of Examples 3, 6, 7, 15, 24 and 25.

The compounds were further tested as fungicides in spore germination tests as indicated in Table 3. The compounds were made up into Formulation A and then tested as inhibitors for germination of spores of Alternaria spp. (A in the table) and Ustilago spp. (U in the table). In the table 10 indicates 100% effectiveness and 0 indicates no effectiveness against spore germination. The concentrations are expressed as p.p.m.

TABLE 3

| | A | | | U | | |
|---|---|---|---|---|---|---|
| | 1,000 | 100 | 10 | 1,000 | 100 | 10 |
| Compound of Example: | | | | | | |
| 1 | 10 | 8 | 2 | | | |
| 2 | 10 | 6 | 1 | | | |
| 3 | 10 | 6 | 2 | | | |
| 4 | 8 | 8 | 2 | | | |
| 5 | 10 | 10 | 10 | | | |
| 6 | 8 | 6 | 3 | | | |
| 7 | 10 | 8 | 5 | | | |
| 8 | 6 | 2 | 2 | | | |
| 11 | 8 | 8 | 2 | | | |
| 13 | 10 | 10 | 0 | 10 | 10 | 0 |
| 15 | 10 | 10 | 8 | 10 | 10 | 8 |
| 16 | 10 | 10 | 10 | 10 | 10 | 10 |
| 17 | 10 | 10 | 8 | 10 | 10 | 8 |
| 20 | 4 | 2 | 2 | | | |
| 22 | 10 | 10 | 2 | | | |
| 23 | 10 | 5 | 2 | | | |
| 24 | 10 | 5 | 0 | 10 | 0 | 0 |
| 25 | 10 | 10 | 10 | 10 | 0 | 0 |
| 26 | 10 | 10 | 10 | 10 | 10 | 0 |

The most effective inhibitors of spore germination were those of Examples 5, 15, 16, 17, 25 and 26.

The compounds were also tested as soil fungicides as indicated in Table 4. The compounds were made up into Formulation A and then added to soil infested with *Pythium irregulare* using peas as a test crop. The concentrations of the fungicides are expressed in lbs./acre. In the table 10 indicates 100% effectiveness and 0 indicates no effectiveness as a soil fungicide.

TABLE 2

| | P | | | R | | | H | | | F | | |
|---|---|---|---|---|---|---|---|---|---|---|---|---|
| | 1,000 | 100 | 10 | 1,000 | 100 | 10 | 1,000 | 100 | 10 | 1,000 | 100 | 10 |
| Compound of Example: | | | | | | | | | | | | |
| 1 | 10 | 10 | 10 | 10 | 8 | 5 | 10 | 10 | 5 | 10 | 8 | 5 |
| 2 | 10 | 10 | | 10 | 0 | | 10 | 10 | | 10 | 0 | |
| 3 | 10 | 10 | 10 | 10 | 10 | 5 | 10 | 10 | 8 | 10 | 10 | 8 |
| 4 | 10 | 10 | 0 | 10 | 10 | 0 | 10 | 10 | 5 | 10 | 10 | 5 |
| 5 | 10 | 10 | 5 | 10 | 10 | 5 | 10 | 10 | 5 | 10 | 10 | 5 |
| 6 | 10 | 10 | 10 | 10 | 10 | 5 | 10 | 10 | 5 | 10 | 10 | 8 |
| 7 | 10 | 10 | 8 | 10 | 10 | 5 | 10 | 10 | 5 | 10 | 10 | 5 |
| 8 | 10 | 10 | 10 | 10 | 0 | 0 | 10 | 10 | 0 | 10 | 0 | 0 |
| 9 | 10 | 0 | | 4 | 0 | | 5 | 0 | | 5 | 0 | |
| 10 | 8 | 4 | | 10 | 0 | | 10 | 0 | | 0 | 0 | |
| 11 | 10 | 10 | 8 | 10 | 10 | 8 | 10 | 10 | 10 | 10 | 10 | 8 |
| 12 | 9 | 8 | 5 | 8 | 5 | 0 | 8 | 5 | 0 | 8 | 7 | 0 |
| 13 | 10 | 10 | 5 | 10 | 10 | 0 | 10 | 10 | 10 | 10 | 0 | 0 |
| 14 | 8 | 7 | 5 | 8 | 7 | 5 | 8 | 8 | 5 | 8 | 7 | 5 |
| 15 | 10 | 10 | 5 | 10 | 10 | 5 | 10 | 10 | 10 | 10 | 10 | 10 |
| 16 | 10 | 10 | 10 | 10 | 10 | 10 | 10 | 10 | 10 | 10 | 10 | 8 |
| 17 | 5 | 0 | 0 | 10 | 10 | 5 | 10 | 10 | 8 | 10 | 10 | 8 |
| 18 | | 0 | | 10 | 0 | | 0 | 0 | | 4 | 0 | |
| 19 | 10 | 4 | | 10 | 0 | | 10 | 0 | | 10 | 0 | |
| 20 | 10 | 10 | 0 | 10 | 0 | 0 | 10 | 10 | 0 | 10 | 0 | 0 |
| 21 | 10 | 0 | | 10 | 0 | | 10 | 0 | | 10 | 0 | |
| 22 | 10 | 10 | 5 | 10 | 5 | 5 | 10 | 10 | 8 | 10 | 5 | 5 |
| 23 | 10 | 10 | 5 | 10 | 5 | 5 | 10 | 10 | 0 | 10 | 5 | 5 |
| 24 | 10 | 10 | 5 | 10 | 10 | 5 | 10 | 10 | 10 | 10 | 10 | 10 |
| 25 | 10 | 10 | 10 | 10 | 10 | 5 | 10 | 10 | 10 | 10 | 10 | 5 |
| 26 | 10 | 0 | 0 | 10 | 5 | 0 | 10 | 10 | 10 | 10 | 0 | 0 |

TABLE 4

| Compound of Example: | 200 | 50 | 25 | 12.5 |
|---|---|---|---|---|
| 1 | 9 | 8 | 6 | 0 |
| 2 | 9 | 2 | | |
| 3 | 8 | 4 | | |
| 4 | 8 | 6 | 3 | 0 |
| 5 | 8 | 10 | 7 | 5 |
| 6 | 9 | 10 | 9 | 6 |
| 7 | 7 | 3 | | |
| 8 | 8 | 6 | | |
| 9 | 7 | 3 | | |
| 10 | 6 | 3 | | |
| 11 | 9 | 10 | 7 | 0 |
| 12 | 0 | 0 | | |
| 14 | 0 | 0 | | |
| 16 | 10 | 6 | | |
| 18 | 0 | 0 | | |
| 19 | 0 | 0 | | |
| 20 | 0 | 0 | | |
| 21 | 8 | 3 | | |
| 22 | 9 | 9 | 6 | 6 |
| 23 | 6 | 4 | | |
| 24 | 10 | 8 | | |
| 25 | 9 | 8 | | |
| 26 | 9 | 7 | | |

The most effective soil fungicides in this test were those of Examples 1, 5, 6, 11, 22, 24 and 25.

The compounds were additionally tested as post emergent herbicides as indicated in Table 5. The compounds were made up into Formulation A and then applied to growing plants at the indicated rates in lbs./acre. In the table, 10 indicates 100% effectiveness and 0 indicates no effectiveness as a herbicide.

The compound of Example 14 is of particular interest in that it can be applied in a cornfield at appropriate dosages which will not adversely effect the corn but will act as a herbicide against most other plants. The compounds of Examples 4, 5, 6, 8, 12, 21, 22, 24 and 25 also were excellent herbicides.

Some of the compounds were also tested as cotton defoliants as indicated in Table 7. The compounds were made up into Formulation A and then applied to growing cotton plants. The results in the table are expressed as percent cotton defoliation at the indicated application rate in lbs./acre.

TABLE 7

| Compound of Example: | 8 | 4 | 2 |
|---|---|---|---|
| 3 | 80 | | 44 |
| 4 | 59 | | 53 |
| 5 | 79 | | 48 |
| 6 | 75 | | 62 |
| 7 | 45 | | 33 |
| 9 | 57 | | 31 |
| 10 | 58 | | 6 |
| 11 | 79 | | 50 |
| 12 | | 27 | 18 |
| 14 | | 60 | 72 |
| 18 | 0 | | 0 |
| 19 | 83.9 | | 39.8 |
| 20 | 55 | | 0 |
| 21 | 44 | | 21 |
| 22 | 79 | | 33 |
| 23 | 23 | | 0 |

TABLE 5

| | Sugar Beets | | | | | Flax | | | | | Oats | | | | | Radish | | | | | Wheat | | | | |
|---|---|---|---|---|---|---|---|---|---|---|---|---|---|---|---|---|---|---|---|---|---|---|---|---|---|
| | 20 | 10 | 8 | 5 | 2 | 20 | 10 | 8 | 5 | 2 | 20 | 10 | 8 | 5 | 2 | 20 | 10 | 8 | 5 | 2 | 20 | 10 | 8 | 5 | 2 |
| Compound of Example: | | | | | | | | | | | | | | | | | | | | | | | | | |
| 2 | | 9 | | | | | 7 | | | | | 9 | | | | | 5 | | | | | 7 | | | 0 |
| 3 | | 10 | | | | | 7 | | | | | 9 | | | | | 2 | | | | | 8 | | | 3 | | 9 | | | 5 | | 3 | | | 8 | | | 7 |
| 4 | | 10 | | | 10 | | 10 | | | 10 | | 7 | | | 4 | | 10 | | | 7 | | 10 | | | 6 |
| 5 | | 10 | | | 7 | | 10 | | | 5 | | 10 | | | 7 | | 10 | | | 6 | | 10 | | | 5 |
| 6 | | 10 | | | 9 | | 10 | | | 6 | | 10 | | | 7 | | 10 | | | 6 | | 9 | | | 7 |
| 7 | | 10 | | | 2 | | 4 | | | 0 | | 7 | | | 2 | | 6 | | | 1 | | 6 | | | 4 |
| 8 | | 9 | | | 7 | | 10 | | | 6 | | 9 | | | 7 | | 9 | | | 4 | | 7 | | | 8 |
| 10 | | | | | | | | | | | | 3 | | | 0 | | | | | | | 0 | | | 0 |
| 11 | | 10 | | | 8 | | 10 | | | 3 | | 8 | | | 4 | | 10 | | | 6 | | 8 | | | 4 |
| 12 | | 10 | | | 9 | | 10 | | | 9 | | 10 | | | 7 | | 9 | | | 9 | | 9 | | | 6 |
| 14 | | 10 | | | 10 | | 10 | | | 10 | | 8 | | | 7 | | 9 | | | 8 | | 8 | | | 6 |
| 18 | | 10 | | | 4 | | | | | | | 0 | | | 0 | | 7 | | | 3 | | 0 | | | 0 |
| 19 | | 8 | | | 0 | | 8 | | | 3 | | 0 | | | 0 | | 6 | | | 3 | | 0 | | | 0 |
| 21 | | 9 | | | 9 | | 8 | | | 9 | | 9 | | | 8 | | 10 | | | 8 | | 9 | | | 9 |
| 22 | | 10 | | | 7 | | 10 | | | 3 | | 10 | | | 6 | | 9 | | | 6 | | 9 | | | 4 |
| 23 | | 9 | | | 4 | | 2 | | | 1 | | 5 | | | 7 | | 4 | | | 3 | | 5 | | | 5 |
| 24 | | 10 | | | 4 | | 10 | | | 8 | | 10 | | | 5 | | 10 | | | 4 | | 10 | | | 5 |
| 25 | | 10 | | | 4 | | 10 | | | 4 | | 10 | | | 9 | | 10 | | | 4 | | 10 | | | 3 |
| 26 | | 8 | | | 1 | | 7 | | | 3 | | 10 | | | 4 | | 7 | | | 3 | | 8 | | | 4 |

Several of the compounds made up in Formulation A were included in secondary post-emergent herbicide tests as indicated in Table 6.

The most effective cotton defoliants were the compounds of Examples 6 and 14, of course care should be taken to be sure that the compounds are applied at cotton

TABLE 6

| Compound of Example: | Lbs./acre | Cucumber | Beans | Cotton | Radish | S. Beets | Alfalfa | Oats | Corn | Wheat | Flax |
|---|---|---|---|---|---|---|---|---|---|---|---|
| 9 | 10 | 9 | 9 | 9 | 10 | 10 | 10 | 7 | 3 | 9 | 10 |
| | 5 | 8 | 8 | 7 | 9 | 10 | 10 | 7 | 3 | 9 | 10 |
| | 2 | 7 | 7 | 4 | 6 | 10 | 10 | 3 | 2 | 3 | 4 |
| | 1 | 4 | 4 | 3 | 4 | 6 | 8 | 3 | 2 | 3 | 3 |
| 12 | 10 | 10 | 9 | 8 | 10 | 10 | 10 | 7 | 6 | 9 | 10 |
| | 5 | 10 | 9 | 6 | 9 | 10 | 10 | 5 | 6 | 8 | 10 |
| | 2 | 8 | 7 | 4 | 5 | 10 | 10 | 4 | 0 | 2 | 3 |
| | 1 | 8 | 6 | 3 | 3 | 0 | 3 | 3 | 0 | 2 | 2 |
| 14 | 10 | 9 | 9 | 9 | 10 | 10 | 10 | 8 | 0 | 9 | 9 |
| | 5 | 9 | 8 | 6 | 10 | 10 | 10 | 7 | 0 | 6 | 8 |
| | 2 | 7 | 8 | 5 | 7 | 10 | 9 | 3 | 0 | 0 | 3 |
| | 1 | 7 | 6 | 4 | 3 | 4 | 3 | 1 | 0 | 0 | 2 |
| 18 | 10 | 10 | 8 | 7 | 10 | 10 | 10 | 7 | 5 | 9 | 10 |
| | 5 | 8 | 6 | 5 | 9 | 10 | 9 | 4 | 5 | 8 | 10 |
| | 2 | 6 | 1 | 2 | 6 | 7 | 9 | 3 | 2 | 2 | 7 |
| | 1 | 3 | 0 | 0 | 3 | 2 | 4 | 0 | 3 | 0 | 0 |
| 21 | 10 | 10 | 9 | 9 | 9 | 10 | 10 | 6 | 2 | 9 | 10 |
| | 5 | 7 | 7 | 8 | 9 | 9 | 10 | 6 | 1 | 7 | 9 |
| | 2 | 6 | 6 | 4 | 6 | 5 | 8 | 4 | 0 | 2 | 9 |
| | 1 | 5 | 4 | 4 | 6 | 5 | 7 | 2 | 0 | 1 | 2 | defoliants at a lower rate than that at which they have strong herbicidal properties. The compounds are also suitable as defoliants for beans and other plants.

We claim:

1. A compound having the formula:

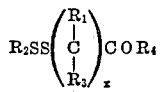

where $R_1$ is hydrogen and $R_3$ is selected from the group consisting of hydrogen and lower alkyl; $R_2$ is selected from the group consisting of trichloroethyl and dichlorovinyl, $R_4$ is selected from the group consisting of OH and OM where M is selected from the group consisting of sodium, potassium, calcium, zinc, silver, copper, barium, iron, manganese, magnesium and cobalt, and $x$ is an integer from 1 to 2 inclusive.

2. A compound according to claim 1 wherein $R_4$ is selected from the group consisting of OH and OM where M is selected from the group consisting of sodium, potassium, calcium and magnesium.

3. A compound according to claim 1 wherein $R_2$ is dihalovinyl.

4. A compound according to claim 3 wherein $R_2$ is dichlorovinyl.

5. S-(1,2,2-trichloroethylthio)thioglycolic acid.
6. S-(trihaloethylthio)thiolactic acid.
7. S-(dihalovinylthio)thioglycolic acid.
8. S-(dichlorovinylthio)thioglycolic acid.
9. S-(dihalovinylthio)thiolactic acid.

References Cited

UNITED STATES PATENTS

| 2,560,421 | 7/1951 | Eby | 260—608 |
| 2,553,777 | 5/1951 | Hawley et al. | 260—481 XR |
| 2,553,778 | 5/1951 | Hawley et al. | 260—481 XR |
| 2,719,170 | 9/1955 | Harris | 260—481 |

FOREIGN PATENTS 1,075,107  2/1960  Germany.

LORRAINE A. WEINBERGER, *Primary Examiner.*

ALBERT P. HALLUIN, *Assistant Examiner.*

U.S. Cl. X.R.

71—72, 97, 98; 167—22; 260—247.2, 326, 429, 429.9, 430, 438.1, 439, 455, 479, 481, 502.6, 537, 551, 561